United States Patent [19]
Yung

[11] Patent Number: 5,592,679
[45] Date of Patent: Jan. 7, 1997

[54] APPARATUS AND METHOD FOR DISTRIBUTED CONTROL IN A PROCESSOR ARCHITECTURE

[75] Inventor: Robert Yung, Fremont, Calif.

[73] Assignee: Sun Microsystems, Inc., Mountain View, Calif.

[21] Appl. No.: 339,518

[22] Filed: Nov. 14, 1994

[51] Int. Cl.$^6$ .................................................... G06F 15/82
[52] U.S. Cl. ........................ 395/800; 395/444; 395/395; 364/DIG. 1; 364/247.4; 364/245.7; 364/228; 364/231.8
[58] Field of Search .................................. 395/375, 800, 395/444, 476, 481

[56] References Cited

U.S. PATENT DOCUMENTS

| | | | |
|---|---|---|---|
| 4,594,660 | 6/1986 | Guenthner et al. | 395/375 |
| 5,467,476 | 11/1995 | Kawaski et al. | 395/375 |
| 5,471,633 | 11/1995 | Colwell et al. | 395/800 |
| 5,524,262 | 6/1996 | Colwell et al. | 395/800 |

OTHER PUBLICATIONS

Product description of the Thunder Chip entitled "The Thunder SPARC Processor", Hot Chips VI, by Bruce D. Lightner, Aug. 15–16, 1994, pp. 201–210.

Taylor; "A 100 MHz Floating Point/Integer Processor", IEEE, 1990.

Peleg et al; "Future Trends in Microprocessors: Out of Order Execution Speculative Branching and ISC Performance Potential"; 1991; IEEE.

Weiss et al. ( "Instruction Issue Logic for Pipelined Super-Computers") 1984, IEEE.

*Primary Examiner*—Larry D. Donaghue
*Attorney, Agent, or Firm*—Kang S. Lim

[57] ABSTRACT

The present invention provides a multi-level instruction scheduling system for controlling multiple execution pipes of a distributed data flow (DDF) processor. The multi-level scheduling system includes a simple global instruction scheduler and multiple local instruction schedulers corresponding to the number of execution pipes. The global instruction scheduler is responsible for distributing instructions among the execution pipes. Each local instruction scheduler is only responsible for scheduling its share of distributed instructions and matching the reduced number of instructions with the execution units of the corresponding execution pipe when all its source operands are available. Source operands are garnered in one of three ways. First, the local instruction scheduler ensures that locally generated register operand values are stored in a local register buffer and made available quickly to younger instructions distributed to the execution pipe. Second, when source operand values of the instruction are not available in the local register buffer, an inter-pipe operand request is made to an arbiter. If the operand value(s) is available from another execution pipe, a transfer of the source operand(s) is initiated via an inter-pipe bypass coupling the first and second execution pipes. Third, if the source register operand value(s) cannot be found in any of the other execution pipes, the register operand value(s) is retrieved from a global register file via an inter-pipe bypass. This multiple execution pipe architecture advantageously lends itself to software optimizing techniques such as multi-tasking, system exception/trap handling and speculative execution, e.g., instruction branch prediction techniques.

9 Claims, 2 Drawing Sheets

APPARATUS AND METHOD FOR DISTRIBUTED CONTROL IN A PROCESSOR ARCHITECTURE

BACKGROUND OF THE INVENTION

1. Field of the Invention

The invention relates to the field of computer processor architecture. More particularly, the present invention relates to the field of distributed control in a computer processor.

2. Description of the Related Art

The processing speed of a computer with a processor having a single execution unit is governed primarily by two factors. The first factor is the instruction cycle time. The second factor is the parallelism or complexity of the architecture/microarchitecture and its implementation i.e., the total amount of computation the execution unit can accomplish with each instruction. Hence, the effective processing speed of such a processor can be boosted by decreasing the cycle time, increasing the parallelism of the microarchitecture, or both.

However, the two factors described above often compete with each other. Optimizing one factor may result in a compromise of the other factor. For example, if the architecture is enhanced to include an instruction for multiplying two dimensional arrays of floating point numbers, the cycle time of such an instruction will increase. Conversely, in order to minimize the average cycle time, the instruction set should include only simple instructions. While pipelining can mitigate the increase in cycle time associated with complex instructions, pipelining also results in increased instruction latency.

In the quest for higher performance, various processor architectures have been explored, including data flow processors with multiple execution units capable of simultaneously executing multiple instructions. Commercial implementations include LSI Logic's "Lightning" and Hyundai Electronic's "Thunder" SPARC processors. The basic architecture for a data flow processor evolved from the observation that although conventional software instructions are generally written and executed in a serial program order, in practice operand interdependencies of instructions are rarely at a 100%, i.e., it is rare that every instruction cannot be executed until all previous instructions have been executed. Rather, instruction operand interdependencies typically are less than 50%. Therefore, it is possible for several independent instructions to be processed simultaneously by separate execution units in a single cycle. Further, the instruction operand interdependencies can be reduced by using parallelism oriented software programming languages and compiler techniques.

FIG. 1 is a block diagram showing a conventional data flow processor architecture having multiple execution units. Data flow processor 100 includes an instruction cache memory 110, a prefetch buffer 120, a centralized instruction scheduler 130 with a speculative register file 135, a plurality of execution units 141, 142, . . . 149, and a register file/memory 190. Prefetched buffer 120 is coupled between instruction cache memory 110 and centralized instruction scheduler 130. Register file/memory 190 is coupled to centralized instruction scheduler 130. Each of the plurality of execution units 141, 142, . . . 149 are coupled to centralized instruction scheduler 130.

As each instruction is processed by data flow processor 100, the instruction acquires one of four status, pending, issued, completed and retired. An instruction is pending, when the an instruction has been fetched from instruction cache 110 and is stored in prefetch buffer 120 while waiting for an available execution unit and/or for one or more source operands. In an issued state, the instruction has been issued by centralized instruction scheduler 130 to execution unit 141 and the source operand(s) of the instruction are available. Next, the instruction is completed, i.e., executed by execution unit 141. Finally, the instruction is retired. When retired, the appropriate execution unit, e.g., unit 141, is responsible for returning status and result values of the retired instruction to speculates register file 135 of centralized instruction scheduler 130 so as to update the corresponding instruction status of processor 100. In turn, centralized instruction scheduler 130 returns resources such as execution unit 141 to the free pool of execution units and transfers the destination operand value of the retired instruction to register file 190.

Since centralized instruction scheduler 130 has multiple execution units 141, 142, . . . 149, theoretically, data flow processor 100 can have a maximum of N instructions issued, where N is equal to the total number of execution units multiplied by the number of stages in each execution unit. Hence, with an ideal set of instructions, where there are no operand interdependencies, N issued instructions can also be executed simultaneously. In practice, there will usually be some operand interdependencies between the N issued instructions and the execution of some of the issued instructions will have to be deferred while awaiting source operand values which are available after the completion of all other older instructions. Speculative register file 135 serves as a temporary depository for the operand values necessary for satisfying operand interdependencies between instructions issued to the separate execution units. Register file 135 is different from a programmer visible or a permanent register file. For example, programmer visible file may contain temporary register values that may be invalidated when the corresponding register setting instruction is aborted during execution. Instead, register file 135 is transparent or invisible to the programmer and is used as a private pool of registers accessible by centralized instruction scheduler 130. As such, a moderate amount of concurrent processing can take place, thereby enabling data flow processor 100 to accomplish a high instruction throughput relative to the conventional processor with a single execution unit.

Unfortunately, this moderate increase in processing speed is accompanied by an exponential increase in the control circuitry complexity of processor 100 for scheduling every instruction and keeping track of the status of all execution units 141, 142, . . . 149. This control and operand information maintained by centralized instruction scheduler 130 increases significantly as the number of execution units 141, 142, . . . 149 is increased and/or the number of pending instructions in prefetch buffer 120 is increased. As such, conventional data flow processor 100 is severely limited by the capability of its single instruction scheduler 130 to maintain this high volume of control and data information. In addition, the scalability of processor 100 is limited by the increased circuit complexity of centralized instruction scheduler 130 required for controlling execution units 141, 142, . . . 149.

SUMMARY OF THE INVENTION

The present invention provides a multi-level instruction scheduling system for controlling multiple execution pipes of a distributed data flow (DDF) processor. The multi-level scheduling system includes a simple global instruction scheduler and multiple local instruction schedulers, local instruction scheduler each associated with one of the respective execution pipes. The global instruction scheduler is only responsible for distributing instructions among the execution pipes, and hence its circuitry is simple relative to the conventional centralized instruction scheduler, with other control functions deferred to the local instruction schedulers. Similarly, the local instruction schedulers are also simple relative to the centralized instruction scheduler because each local instruction scheduler is only responsible for scheduling its share of distributed instructions and matching the reduced number of instructions with the execution units of the corresponding execution pipe. As a result of the simplified multi-level scheduling system, the DDF processor is easily scalable.

The global instruction scheduler distributes instructions among the execution pipes based on a suitable allocation criteria such as by instruction class, e.g., floating point, integer or boolean, or by operand dependencies. Upon distribution of an instruction to an execution pipe, the respective local instruction scheduler assumes sole responsibility for scheduling the instruction execution. When the source operand values of the instruction are available, the instruction can be matched with an available execution unit of the execution pipe. Source operand values of the instruction are retrieved in one of three ways.

First, the local instruction scheduler ensures that locally generated register operand values are stored in a local register buffer to be used by younger instructions distributed to the execution pipe. Hence, locally generated register result values are made quickly available locally, i.e., within each execution pipe, without the need for external access. In other words, intra-pipe operand interdependencies are resolved locally and quickly by the local instruction scheduler.

Second, when source operand values of the instruction are not available in the local register buffer, an inter-pipe operand request is made to an arbiter. The arbiter which is responsible for resolving inter-pipe operand interdependencies, may broadcast the request to all or a subset of the execution pipes. Alternatively, the arbiter may interrogate the global instruction scheduler to extract the identity of another execution pipe with the required source operand(s). In other embodiments, the source(s) of the needed operand(s) of each instructions, i.e., the identity of the execution pipe(s), is dispatched together with the instruction, thereby simplify the subsequent garnering of the source operand value(s). When the operand value(s) is available from another execution pipe, a transfer of the source operand(s) is initiated via an inter-pipe bypass coupling the first and second execution pipes.

Third, if the source register operand value(s) cannot be found in any of the other execution pipes, the register operand value(s) is retrieved from a global register file. The requested operand value is then transferred via the inter-pipe bypass coupling the first execution unit to the global register file.

When all the source operand values have been transferred to the execution pipe, the instruction is matched with an available execution unit in the execution pipe. Eventually, the instruction completes execution in the execution pipe and is retired. The result operand value generated by the execution pipe is written into the global register file. In addition, the local instruction scheduler communicates the completion of execution to the global instruction scheduler, thereby completing the processing of the instruction.

The distributed data flow (DDF) processor of the present invention has several advantages over the conventional data flow processor. Some advantages result from the hierarchical multi-level scheduling which simplifies scheduling of the global and local instruction schedulers. The simplified global instruction scheduler only needs to process instruction status information from the execution pipes and no longer needs to handle operand values. As such, the DDF processor is easily scalable, and additional execution pipes can be added without a corresponding exponential increase in circuit complexity of the global and local instruction schedulers.

The multiple execution pipe architecture advantageously lends itself to software optimizing techniques such as multi-tasking, system exception/trap handling and speculative execution, e.g., instruction branch prediction techniques. For example, the DDF processor can perform multi-tasking by executing individual tasks in separate execution pipes. Similarly, speculative execution can be implemented by selecting multiple computational paths for execution in separate execution pipes based on their respective cumulative probability.

Other advantages of the multiple execution pipe architecture include reduced control/clock synchronization logic between the execution pipes. For example, while the inter-pipe communication via each bypass is synchronized, each individual execution pipe may operate at its own clock speed and with its own synchronization or clocking strategy. Further, clock speeds for the different execution pipes can be optimized depending on their respective functions.

DESCRIPTION OF THE DRAWINGS

The objects, features and advantages of the system of the present invention will be apparent from the following description in which.

DESCRIPTION OF THE PREFERRED EMBODIMENT

In the following description, numerous details provide a thorough understanding of the present invention. These details include functional blocks and exemplary scheduling criteria to assist a developer in implementing a distributed data flow (DDF) processor. In addition, while the DDF processor of the present invention is described with reference to a specific implementation, the invention is applicable to both data flow and non data flow architectures and environments. In other instances, well-known circuits and structures are not described in detail so as not to obscure the invention unnecessarily.

Figure 1:
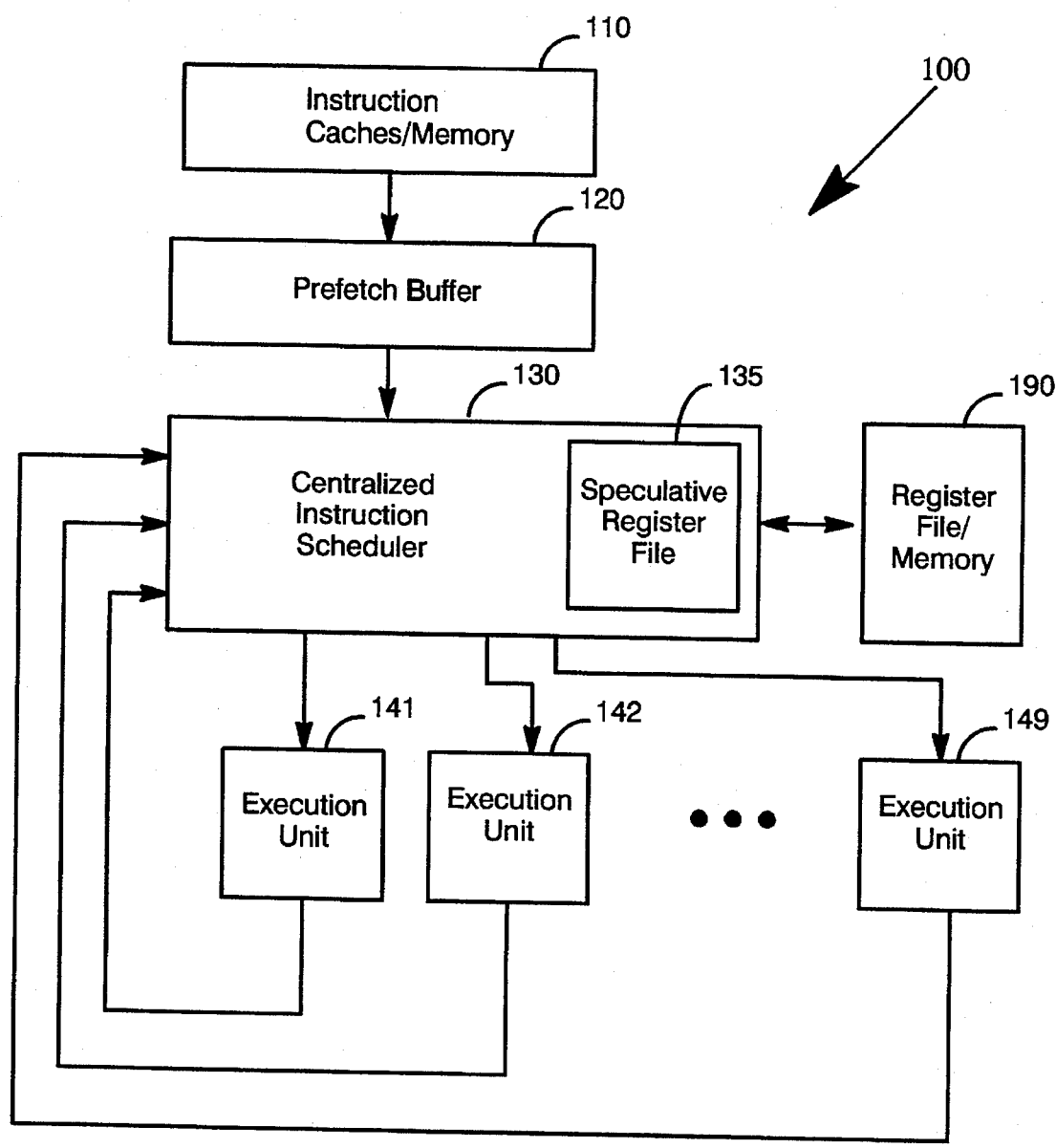
FIG. 1 is a block diagram illustrating a conventional data flow architecture for a processor.
Figure 2:
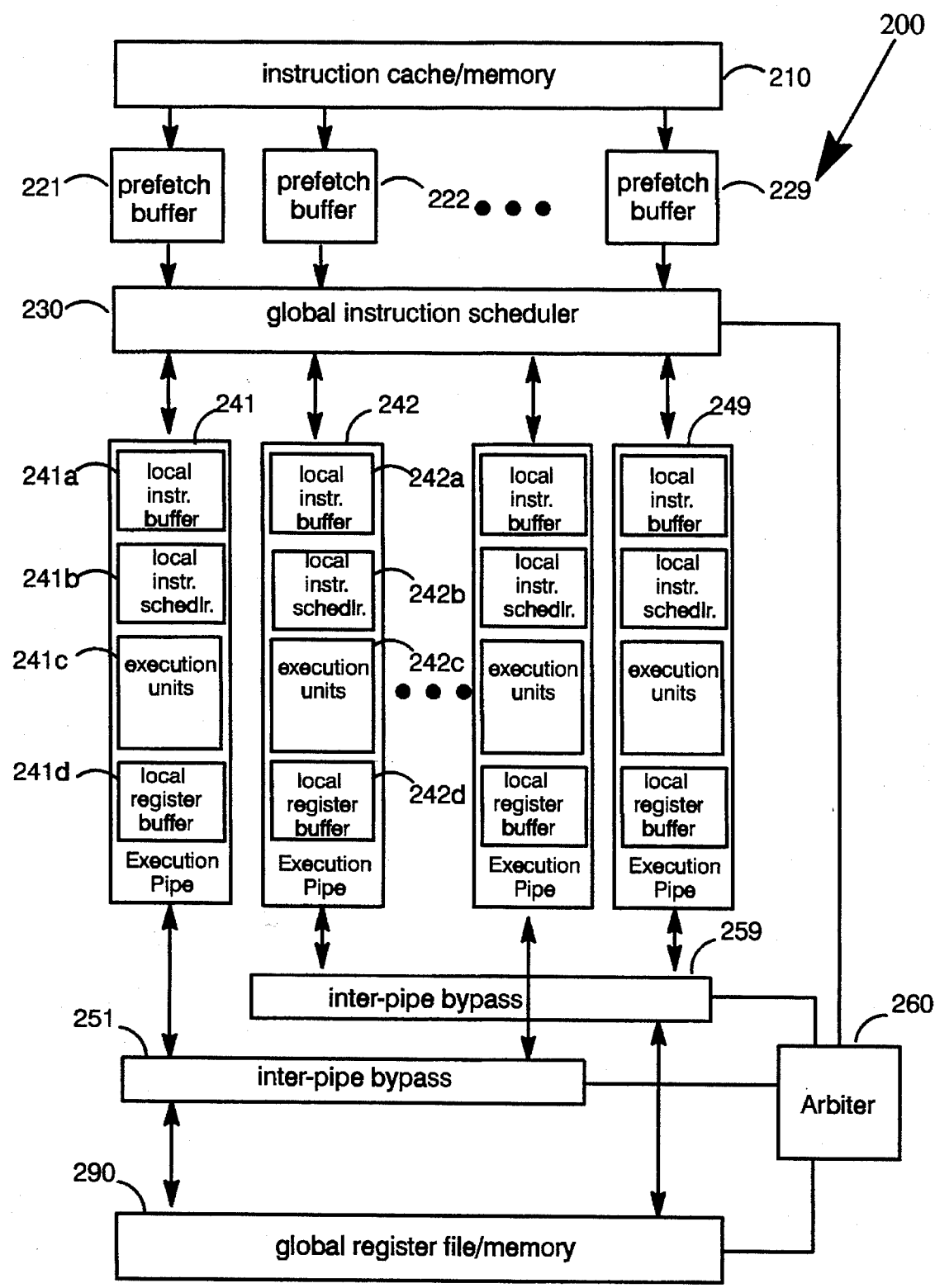
FIG. 2 is a block diagram illustrating a distributed data flow architecture for a processor in accordance with the present invention.

FIG. 2 is a block diagram illustrating the DDF processor architecture in accordance with one embodiment of the present invention. DDF processor 200 includes an instruction cache memory 210, a plurality of prefetch buffers 221, 222, ... 229, a global instruction scheduler 230, a plurality of execution pipes 241, 242, ... 249, one or more inter-pipe bypass(es) 251, ... 259, an arbiter 260, and a global register file/memory 290. Each instruction pipe includes its own local instruction buffer, local instruction scheduler, execution unit(s) and temporary local register buffer. For example, instruction pipe 241 includes a local instruction buffer 241a, a local instruction scheduler 241b, execution unit(s) 241c and a local register buffer 241d. Similarly, instruction pipe 242 includes a local instruction buffer 242a, a local instruction scheduler 242b, execution unit(s) 242c and a local register buffer 242d. Hence a description of the operation of execution pipe 241 is equally applicable the other execution pipes 242, . . . 249.

Prefetch buffers 221, 222, . . . 229 are coupled between instruction cache 210 and global instruction schedule 230. Execution pipes 241, 242, . . . 249 are coupled to global instruction scheduler 230 via local instruction buffers 241a, 242a, . . . 249a, respectively. Execution pipes 241, 242, . . . 249 are coupled to each other and also coupled to register file 290 by one or more inter-pipe bypass(es) 251, . . . 259. Arbiter 260 is coupled to bypasses 251, . . . 259, to global instruction scheduler 230 and to register file 290.

In accordance with one aspect of the invention, DDF processor 200 provides a hierarchical multi-level scheduling scheme for processing a plurality of instructions. Global instruction scheduler 230 is responsible for the top level scheduling which involves allocating and distributing instructions among execution pipes 241, 242, . . . 249. In contrast, local instruction schedulers 241b, 242b, . . . 249b, are responsible for the lower level scheduling which involves matching instructions with execution units and garnering source register operand values for instructions in execution pipes 241, 242, . . . 249, respectively.

In one embodiment, instructions are processed as described below. First, global instruction scheduler 230 fetches instructions from instruction cache 210 via pre-fetch buffers 221, 222, . . . 229. Next, global instruction scheduler 230 distributes the instructions among execution pipes 241, 242, . . . 249. A suitable resource (execution pipe) allocation criteria, such as distribution by instruction class or operand dependencies, can be implemented in order to minimize operand dependencies between instructions distributed to separate execution pipes. Distribution by instruction class works because typically, floating point, integer and boolean instructions operate on floating point, integer and boolean operands, respectively. In the preferred embodiment, instructions are distributed by global instruction scheduler 230 together with information about their source operands.

Once an instruction has been distributed to the respective execution pipe, global instruction scheduler 230 is no longer responsible for resolving operand interdependencies between the instructions. Rather, upon distribution to execution pipes 241, 242, . . . 249, e.g., pipe 241, the respective local instruction schedulers 241b, 242b, . . . 249b, e.g., scheduler 241b, assume responsibility for local scheduling of instructions. The instructions are then loaded into the respective local instruction buffers 241a, 242a, . . . 249a, e.g., buffer 241a, by global instruction scheduler 230. In turn, local instruction scheduler 241b retrieves instructions which are ready for execution from local buffer 241a and dispatches the instructions to execution unit(s) 241c.

Note that instructions in execution pipe 241 are not necessarily executed in the order they are distributed by global instruction scheduler 230. This is because local scheduling by instruction scheduler 241b is based upon the availability of free execution units 241c within execution pipe 241 and the availability of source operands of the instructions in local instruction buffer 241a. For example, an older (earlier in program order) instruction in buffer 241a may be waiting for a source operand while a younger (later in program order) instruction in buffer 241a may have all the necessary source operand value(s) and is ready for execution. In this case, the younger instruction is dispatched when an approximate execution unit is available.

In accordance with another aspect of the present invention, in order to facilitate rapid access to register operand values, local instruction scheduler 241b stores locally generated register operand values in local register buffer 241d for use as source operands values by younger instructions distributed to execution pipe 241. As a result, all locally generated register register result values are made available locally, i.e., within execution pipe 241, without the need to access outside of execution pipe 241. In other words, intra-pipe operand interdependencies are resolved locally by local instruction scheduler 241b. During normal program execution, invalidation of operand values stored in register buffer 241d by local instruction scheduler 241b is not required because the respective registers in register buffer 241d are renamed prior to reuse.

The hierarchical register file system which includes global register file 290 and multiple local register buffers 241d, 242d, . . . 249d is advantageous over the prior art for the following reasons. A single centralized register file is not ideal because interconnecting the large fast global memory to a large number of execution units is prohibitively expansive in silicon area and requires extremely complex circuitry with many I/O ports. This expansion increases exponentially as the size of the global memory and/or the number of execution units increase.

Conversely, by dedicating a small number of fast register buffers located close to a small subset of execution units as in the present invention, faster access times to the most frequently accessed operands are possible without incurring a high penalty in silicon area. This is because statistically the majority (e.g., >90%) of source operands are generated by other instructions which are spaced less than ten instruction lines away in program order. Hence, instead of a single global register file, local register buffers 241d, 242d . . . 249d efficiently handle the bulk of the operand accesses without prohibitively increasing the overall circuit complexity of DDF processor 200. As a result, the hierarchical register file system is easily scalable. Note that the above described hierarchical register file organization is equally applicable to other processor architectures having multiple execution units, e.g., a single pipeline processor with multiple execution units.

In the (less likely) event that one or more source operand(s) of an instruction in execution pipe 241 cannot be found in local register buffer 241d, an inter-pipe operand request is made by execution pipe 241 to arbiter 260. Arbiter 260 which is responsible for resolving inter-pipe operand interdependencies, initiates a request for the identity of the execution pipe with the required source operand(s). If the operand value(s) is located in another execution pipe, upon receiving the identity of the execution pipe with the source operand, e.g., pipe 242, from global instruction scheduler 230, arbiter 260 initiates a transfer of the source operand(s) via the appropriate one of inter-pipe bypass(es) 251, . . . 259. Note that generally, inter-pipe bypasses are required for interconnecting execution pipes with similar classes of execution unit(s). For example, a first and a second pair of execution pipes 241, 242, . . . 249 can be floating point execution pipes and integer execution pipes, respectively, with a first bypass interconnecting the pair of floating point execution pipes and a second bypass interconnecting the pair of integer execution pipes.

Hence, the primary function of arbiter 260 is to regulate inter-pipe operand value traffic. In some embodiments, arbiter 260 may also be responsible for determining the location (execution pipe) of a needed source operand value by, for example, by interrogating global instruction scheduler 230.

In the (even less likely) event that the source operand value(s) cannot be located in any of execution pipes 241, 242, . . . 249, then a request to access global register file 290 is initiated. The requested register operand value is transferred from global register file 290 into execution pipe 241. If the instruction has all needed source operand values, it is now ready to matched to an execution unit of execution pipe 241.

Once all the source operands of each instruction in execution pipe 241 has been retrieved either from within the same pipe 241, from one of the other execution pipes 242, . . . 249 via inter-pipe bypass 251, and/or from global register file 290, local instruction scheduler 241b matches and dispatches the instruction to a free execution unit of execution unit(s) 241c. Local register buffer 241d of execution pipe 241 advantageously allows faster local access to register values produced within execution pipe 241. Eventually, the instruction completes execution in execution pipe 241 and is retired. The result operand value generated by execution pipe 241 is then written into global register file 290. In addition, local instruction scheduler 241b communicates the completion of execution to global instruction scheduler 230, thereby completing the processing of the instruction.

Distributed data flow (DDF) processor 200 has several advantages over the conventional data flow processor 100. Some advantages result from the hierarchical multi-level scheduling which simplifies scheduling by global instruction scheduler 230 and local instruction schedulers 241b, 242b, . . . 249b. Other advantages result from the inherent parallelism and concurrency provided by the multiple prefetch buffers 221, 222, . . . 229 and multiple execution pipes 241, 242, . . . 249, of DDF processor 200.

As discussed above, since global instruction scheduler 230 is only responsible for distributing instructions among execution pipes 241, 242, . . . 249, the control circuitry of global instruction scheduler 230 is simpler than that of the conventional centralized instruction scheduler 130. In addition, since the number of instructions needed to keep each execution pipe busy is small relative to that necessary to keep centralized instruction scheduler 130 busy, the control circuitry of local instruction schedulers 241b, 242b, . . . 249b is correspondingly simple. As such, DDF processor 200 is easily scalable, and additional execution pipes can be added with relative ease, i.e., without exponentially increasing the circuit complexity of global instruction scheduler 230.

The multiple prefetch buffer and multiple execution pipe architecture of DDF processor 200 also lends itself to software and system optimizing techniques such as multi-tasking, system exception/trap handling and speculative execution, e.g., instruction branch prediction techniques. For example, DDF processor 200 can perform multi-tasking by segregating each task in a separate one of prefetch buffers 221, 222, . . . 229 and concurrently executing individual tasks in a separate one of execution pipes 241, 242, . . . 249. Although multiple sets state may be needed to support multi-tasking, hardware such as local register buffers 241d, 242d, . . . 249d dedicated to execution units 241c, 242c, . . . 249c, respectively, and inter-pipe bypasses 251, . . . 259 for sharing data and communicating between multiple execution tasks/paths already exist.

Similarly, speculative execution can be implemented in DDF processor 200 by selecting multiple computational paths for execution in separate execution pipes based on their respective cumulative probability. As in multi-tasking, speculative execution is accomplished by segregating each selected path in a separate one of prefetch buffers 221, 222, . . . 229 and concurrently executing individual tasks in one of execution pipes 241, 242, . . . 249.

These optimizing techniques such as multi-tasking and speculative execution allow multiple context to be active in processor 200 simultaneously, thereby reducing context switching, normally a necessary evil in a conventional single pipeline architecture. By reducing the context switching overhead, the overall utilization of processor 200 is advantageously increased, especially when a task or program is waiting for a short latency event such as a page fault.

Hardware advantages of the multiple execution pipe architecture include reduced control and clock synchronization needed between the execution units of execution pipes 241, 242, . . . 239 and the circuit simplicity associated with this more asynchronous architecture. For example, while the inter-pipe communication via each bypass is synchronized, each individual execution pipe may operate at its own clock speed and with its own synchronization or clocking strategy. Further, clock speeds for the different execution pipes can be optimized depending on their respective functions.

Other modifications are possible without departing from the spirit of the invention. For example, the principles of the distributed data flow architecture described above can be practiced in combination with other software and hardware techniques such as pipelining. Hence, the scope of the invention should be determined by the following claims.

What is claimed is:

1. A distributed data flow (DDF) processor comprising:
   a global instruction scheduler for distributing a plurality of instructions into sub-groups of instructions; and
   a first and a second execution pipe coupled to said global instruction scheduler, each said execution pipe includes;
      a local instruction buffer for receiving a corresponding one of said sub-groups of instructions;
      at least one execution unit coupled to said local instruction buffer for executing said corresponding one sub-group of instructions;
      a local register buffer coupled to said at least one execution unit for storing local register operand values generated by said at least one execution unit; and
      a local instruction scheduler for scheduling said corresponding one sub-group of instructions, said local instruction scheduler providing said local register operand values to said at least one execution unit when said local register operand values are useful as source operand values by said at least one execution unit;
   an inter-pipe bypass coupled to said first and said second execution pipe for transferring said local register operand values between said first and said second execution pipe;
   an arbiter coupled to said inter-pipe bypass for garnering one of said local register operand values from said first execution pipe to said second execution pipe when said one local register operand value of said first execution pipe is useful as a source operand value for said second execution pipe; and
   a global register file coupled to said arbiter for storing global register operand values, said arbiter garnering one of said global register operand values from said global register file to said first execution pipe when said one global register operand value is useful as a source operand value for said first execution pipe, wherein said global register file is coupled to said inter-pipe bypass and said one global register operand value is garnered from said global register file to said first execution pipe via said inter-pipe bypass.

2. The DDF processor of claim 1 wherein said instruction distribution is based on instruction classes and operand interdependencies of said instructions.

3. The DDF processor of claim 1 wherein said instruction distribution is based on computational paths of instructions streams.

4. A method of scheduling instructions in a distributed data flow processor having at least a first and a second execution pipe, said method comprising the steps of:

distributing a plurality of instructions among said first and second execution pipes;

scheduling at least two of said instructions for execution within said first execution pipe;

providing a local register operand value generated by said first execution pipe for use as a first source operand value by said first execution pipe;

garnering a local register operand value generated by said second execution pipe to said first execution pipe when said local register operand value of said second execution pipe is useful as a second source operand value for said first execution pipe, said local register operand value garnered via an inter-pipe bypass coupled to said first and second execution pipes; and garnering a global register operand value from a global register file to said first execution pipe when said global register operand value is useful as a third source operand value for said first execution pipe, said global register file is coupled to said inter-pipe bypass and said global register operand value is garnered from said global register file to said first execution pipe via said inter-pipe bypass.

5. The method of claim 4 wherein said instruction distribution is based on instruction classes of said instructions.

6. The method of claim 4 wherein said scheduling step includes the step of:

matching an execution unit of said first execution pipe to one of said instructions; and wherein said garnering step includes the step of providing said first and second source operands for said one instruction to said execution unit.

7. The method of claim 4 wherein said providing step includes the step of retrieving said first source operand value from a local register buffer of said first execution pipe.

8. The method of claim 4 wherein said garnering step includes the step of retrieving said second source operand value from a local register buffer of said second execution pipe.

9. The method of claim 8 wherein said garnering step further includes the steps of:

initiating a request for said second source operand value to an arbiter;

identifying said second execution pipe as a source of said second source operand value; and transferring said second source operand value from said second execution pipe to said first execution pipe.

* * * * *